(12) United States Patent
Mühlhans

(10) Patent No.: US 12,327,654 B2
(45) Date of Patent: Jun. 10, 2025

(54) CABLE FOR A SYSTEM FOR CONDUCTING AND DISTRIBUTING ELECTRICAL ENERGY AND FOR PROVIDING A FAST DATA-CONDUCTING COMMUNICATION LINK

(71) Applicant: GOODVILLE GMBH, Hamburg (DE)

(72) Inventor: Christoph Mühlhans, Hamburg (DE)

(73) Assignee: Goodville GMBH, Hamburg (DE)

( * ) Notice: Subject to any disclaimer, the term of this patent is extended or adjusted under 35 U.S.C. 154(b) by 329 days.

(21) Appl. No.: 17/794,293

(22) PCT Filed: Jan. 22, 2021

(86) PCT No.: PCT/EP2021/051490
§ 371 (c)(1),
(2) Date: Jul. 21, 2022

(87) PCT Pub. No.: WO2021/148627
PCT Pub. Date: Jul. 29, 2021

(65) Prior Publication Data
US 2023/0080575 A1    Mar. 16, 2023

(30) Foreign Application Priority Data

Jan. 23, 2020 (DE) ...................... 10 2020 101 562.3
Mar. 16, 2020 (DE) ...................... 10 2020 107 099.3

(51) Int. Cl.
*H01B 11/22* (2006.01)
*H02G 1/00* (2006.01)

(52) U.S. Cl.
CPC ............. *H01B 11/22* (2013.01); *H02G 1/005* (2013.01)

(58) Field of Classification Search
CPC ..................................................... G02B 6/4483
See application file for complete search history.

(56) References Cited

U.S. PATENT DOCUMENTS 5,371,823 A * 12/1994 Barrett ................. G02B 6/4416
385/100
5,602,953 A * 2/1997 Delage ................... H01B 11/22
385/100

(Continued)

FOREIGN PATENT DOCUMENTS

DE      102015110644 A1    1/2017
EP           2232582 A1    9/2010
JP          S58154802 A    9/1983

*Primary Examiner* — Rhonda S Peace
(74) *Attorney, Agent, or Firm* — Grogan, Tuccillo & Vanderleeden, LLP

(57) ABSTRACT

In order to provide a cable for a system for conducting and distributing electrical energy and for providing a fast data-conducting communication link, with which high data transmission rates can also be realized in a future-proof manner, and which can be easily used in a system for conducting and distributing electrical energy and for providing a fast data-conducting communication link, a cable is proposed for a system for conducting and distributing electrical energy and for providing a fast data-conducting communication link, comprising a sheathing, wherein at least one electrical line and an optical conductor are embedded in the sheathing, and wherein the cable has a cross-section with a one-fold rotational symmetry.

18 Claims, 9 Drawing Sheets

(56) References Cited

U.S. PATENT DOCUMENTS

| | | | | |
|---|---|---|---|---|
| 6,363,192 | B1* | 3/2002 | Spooner | G02B 6/4416 |
| | | | | 385/104 |
| 6,563,990 | B1* | 5/2003 | Hurley | G02B 6/4484 |
| | | | | 385/101 |
| 7,106,931 | B2* | 9/2006 | Sutehall | H02G 3/0487 |
| | | | | 385/101 |
| 7,391,943 | B2* | 6/2008 | Blazer | G02B 6/4431 |
| | | | | 385/103 |
| 7,397,993 | B1* | 7/2008 | Nave | G02B 6/4403 |
| | | | | 385/113 |
| 7,672,556 | B2* | 3/2010 | Keller | G02B 6/4495 |
| | | | | 385/113 |
| 10,497,493 | B1* | 12/2019 | Kummer | H02G 1/00 |
| 2003/0202756 | A1 | 10/2003 | Hurley et al. | |
| 2005/0002622 | A1* | 1/2005 | Sutehall | G02B 6/483 |
| | | | | 385/101 |
| 2008/0292253 | A1 | 11/2008 | Keller | |
| 2009/0218206 | A1 | 9/2009 | Gessler | |
| 2023/0080575 | A1* | 3/2023 | Mühlhans | H01B 11/22 |
| | | | | 7/107 |

* cited by examiner

CABLE FOR A SYSTEM FOR CONDUCTING AND DISTRIBUTING ELECTRICAL ENERGY AND FOR PROVIDING A FAST DATA-CONDUCTING COMMUNICATION LINK

CROSS REFERENCE TO RELATED APPLICATIONS

This application is a national stage of International Application No. PCT/EP2021/051490, filed on Jan. 22, 2021, which claims priority to DE Patent Application No. 10 2020 101 562.3 filed Jan. 23, 2020 and DE Patent Application No. 10 2020 107 099.3 filed Mar. 16, 2020, all of which is hereby incorporated by reference in its entirety.

The present invention refers to a cable with a sheathing for a system for conducting and distributing electrical energy and for providing a fast data-conducting communication link. Furthermore, the present invention relates to a system for conducting and distributing electrical energy and for providing a fast data-conducting communication link, as well as a connection device and a distribution device for such a system.

TECHNOLOGICAL BACKGROUND

In order to accelerate the consumer-oriented installation of high-voltage systems in buildings, the German patent application No. 10 2018 117 906.5 by the applicant proposes a distribution device and a system for the conduction and distribution of electrical energy and the provision of a data-conducting communication link. With this system, a power supply of 230 V at up to 16 A can be provided. The system is also suitable for controlling smart home and lighting technology as well as for providing data transmission with transfer rates from 500 Mbit/s to 1,000 Mbit/s, whereby the data transmission takes place via power-line.

For future needs such as streaming high definition videos and data-intensive commercial activities this network speed might be too low.

DESCRIPTION OF THE INVENTION: OBJECT, SOLUTION, ADVANTAGES

The invention is based on the object of providing a cable for a system to conduct and distribute electrical energy and to offer a fast data-conducting communication link with which high data transfer rates can also be realized in a future-proof manner, and which can be easily used in a system for conducting and distributing electrical energy and to provide a high speed data-conducting communication link.

To solve the object underlying the invention, a cable for a system to conduct and distribute electrical energy and to provide a fast data-conducting communication link is proposed, wherein the cable comprises a sheathing and wherein further at least one electrical line and an optical conductor are embedded in the sheathing, and wherein the cable has a cross-section with a one-fold rotational symmetry By embedding at least one electrical line and an optical conductor in the sheathing of the cable, the cable according to the invention is designed both for conducting and distributing electrical energy by means of the electrical line and for transmitting data via the optical conductor. By using an optical conductor, a fast data-conducting communication connection with high data transmission rates can be provided.

A further advantage of the cable according to the invention is that it can be used for the consumer oriented installation of power and data lines within a building. Due to the simultaneous arrangement of an electrical line and an optical conductor in the cable according to the invention, power lines and data lines no longer have to be laid separately from each other during electrical installation.

With particular advantage, the cable according to the invention has a cross-section with a one-fold rotational symmetry. In particular, the cross-section is viewed perpendicular to a longitudinal extension of the cable, or perpendicular to the at least one electrical conductor embedded in the sheathing of the cable and/or the optical conductor embedded in the sheathing.

A cross-section with a one-fold rotational symmetry is understood to be a cross-section that can only be transferred into itself by a full rotation of 360° around the longitudinal axis of the cable. The one-fold rotational symmetry of the cross-section ensures that the cable according to the invention can only be used in a connection device or distribution device described below in a fixedly defined orientation. This ensures that the cable is installed in such a way that it is protected against polarity reversal or interchange Preferably, it can be provided that the cross-section of the cable is an n-polygonal cross-section, wherein n is preferably greater than or equal to 4, further preferably greater than or equal to 6, in particular preferably greater than or equal to 8.

In particular, it may be preferred that the cross-section is a hexagonal cross-section.

With further advantage, it can be provided that the cross-section is arrowed or arrow-shaped.

Particularly if the cross-section is a hexagonal cross-section, by an arrowed or arrow-shaped configuration of the cross-section, an easy to handle cable can be provided that is protected against polarity reversal or interchanging.

An arrowed or arrow-shaped cross-section can be understood in particular as a cross-section which has two long sides running parallel to each other, in which two shorter sides arranged on one end side of the long sides form an outwardly directed tip or a triangular shape and in which two shorter sides arranged on the other end side of the long sides form an inwardly directed tip or a triangular shape.

Preferably, the sheathing is made of plastic, especially rubber.

With particular advantage, it can be provided that the sheathing has a cavity, the cavity preferably being arranged running over the entire length of the cable, wherein the cavity is particularly preferably formed tubular, pipe-like or channel-like, or wherein the cavity is a tube, a pipe or a channel, and wherein the cavity most preferably has a rectangular or round or oval, in particular elliptical, cross-section.

The cavity may be tubular, pipe-like or channel-like, meaning that the cavity is formed directly in the sheathing during the production of the sheathing, for example in an extrusion process. The cavity can also be formed as a tube, pipe or channel, i.e. a separate tube or pipe or channel is first formed, which is then embedded in the sheathing. The tube or pipe or channel may then be made of the same material or a different material than the sheathing.

Preferably it is provided that the optical conductor is arranged in the cavity.

The arrangement of the optical conductor in the tubular, pipe-like or channel-like formed cavity or in the tube, pipe or channel serves to protect the optical conductor from damage if the radii are too small when bending the cable.

The optical conductor or the cavity with the optical conductor arranged therein can be arranged centrally in the middle of the cross-section of the cable. Furthermore it is also possible that the optical conductor or the cavity with the optical conductor arranged therein is arranged in an edge or end region of the cross-section of the cable. If, for example, the cross-section of the cable is arrowed or arrow-shaped, with an outwardly directed tip or triangular shape and an inwardly directed tip or arrow shape, then the optical conductor or the cavity with the optical conductor arranged therein can be arranged in the area of the outwardly directed tip or triangular shape or the inwardly directed tip or triangular shape. It is also possible that the optical conductor or the cavity with the optical conductor arranged therein can be arranged in the center of the cross-section of the cable between and at approximately the same distance from the outwardly directed tip and the inwardly directed tip.

By arranging the optical conductor or the cavity with the optical conductor arranged therein centrally in the middle of the cross-section of the cable, forces and stresses on the optical conductor are reduced when the cable is bent.

If the cavity is formed with an oval, in particular elliptical, cross-section, the main axis of the oval, in particular elliptical, cross-section is preferably aligned along or transverse to a longitudinal axis of the elongated cross-section of the cable. For example, if the cross-section of the cable is arrowed or arrow-shaped, the main axis of the oval, in particular elliptical, cross-section can preferably be aligned along or transverse to an imaginary line connecting the outwardly directed tip and the inwardly directed tip.

By aligning the major axis of the oval, especially elliptical, cross-section along or transverse to a longitudinal axis of the elongated cross-section of the cable, the forces and stresses on the optical conductor are reduced when the cable is bent. In particular, the major axis of the oval, elliptical, cross-section is aligned along one of the main bending axes due to the alignment along or transverse to a longitudinal axis of the elongated cross-section in the use of the cable, so that when bending the cable around the main bending axis, the forces occurring in the process are advantageously diverted and distributed.

It may be particularly preferred that the optical conductor is arranged, in particular completely, at a distance from a wall of the cavity, and/or that the optical conductor is arranged centrally in the cavity.

By the fact that the optical conductor is arranged centrally and/or at a distance from the wall in the cavity, a particularly effective protection against damage to the optical conductor in case of bending of the cable is ensured.

If the cable is bent, the cavity running along the length of the cable is also bent. Since the optical conductor is arranged within the cavity, but at a distance from its wall, the optical conductor in the cavity can deflect the bending somewhat, so that the bending radius of the optical conductor within the cavity is less than the bending radius of the cable or the cavity itself. This reduces the risk of damage, e.g. breakage, of the optical conductor when the cable is bent With further advantage, it can be provided that in the cavity positioning means for positioning the optical conductor in the cavity are arranged.

In particular, the positioning means are designed to keep the optical conductor within the cavity at a distance from the wall of the cavity and/or to position it centrally in the cavity.

Preferably, the positioning means may comprise a thread, a foil or a membrane.

With particular advantage, the positioning means comprise several, especially preferably four, thin membranes, which are arranged extending radially inwards from the wall of the cavity and especially preferably along the entire length of the cable in the cavity. The thin membranes can consist of a thin plastic layer.

The four radially inwardly directed membranes meet approximately in the center of the cavity. The optical conductor is arranged at the point of contact of the membranes in the center of the cavity and/or attached to the membranes so that the optical conductor is kept at a distance from the wall of the cavity and/or centrally in the cavity.

Preferably, the membranes consist of a flexible material layer, for example a plastic or rubber layer.

In particular, when the positioning means are designed as thin membranes, the advantage is achieved that the optical conductor is held or positioned securely and centrally in the cavity, and that at the same time the optical conductor can continue to avoid the bending due to the flexibility of the membranes when bending the cavity, so that damage to the optical conductor is prevented when the cable is bent.

With further advantage, it may be provided that the cable has at least two, preferably at least three, electrical lines, and/or that the at least one electrical line consists of copper Further, it may be preferably provided that the optical conductor is a glass fiber, and/or that the optical conductor has a diameter between 50 μm and 200 μm, preferably between 100 μm and 150 μm, particularly preferably between 120 μm and 130 μm.

Very preferably, the diameter of the optical conductor is 125 μm.

It can further be advantageously provided that the cavity has a diameter of between 0.5 mm and 1.5 mm, preferably between 0.7 mm and 0.9 mm, particularly preferably 0.7 mm.

With further advantage, it can be provided that the optical conductor is a multimode conductor or a single-mode conductor.

If more than one electrical line is provided, the at least two electrical lines of the cable preferably run distanced apart and substantially parallel to each other. Advantageously, the electrical lines may have an elongated cross-section. For example, the electrical lines may have a cross-section with a substantially rectangular basic shape. The top and/or bottom of each electrical line could be rounded. The top side and the bottom side are preferably the two opposite short sides in a cross-sectional view of the electrical lines. The electrical lines may be arranged in the sheathing in such a way that the elongated cross-section of each electrical line is oriented transversely to the elongated cross-section of the cable.

The system cable preferably has a single sheathing, which is arranged both around the electrical lines as well as in the spaces between the electrical lines and which further forms the tubular, pipe-like or channel-like cavity or encloses the tube, pipe or channel, respectively. Separate sheathings for each electrical line within the cable are preferably not provided.

Thus, due to its shape and design, the cable has a defined position and arrangement of the electric lines or the optical conductor, respectively, and enables the connection of devices and distribution devices that must be connected in the correct phase and can hardly be used or manipulated in foreign installations, since the electric lines are not separately insulated and color-coded.

Preferably, the bending resistance of the sheathing and the bending resistance of at least one electrical line may be similar. In particular, in combination with the shape of the cross-section of the cable and/or the arrangement and orientation of the elongated cross-section of at least one electrical line transverse to the elongated cross-section of the cable, a cable may be provided which essentially allows only two bending directions. In addition, the risk of twisting or diagonal twisting of the cable can be reduced.

With particular advantage, it can be provided that the cable used for the transmission of data is designed with transmission rates of at least 10 GBit/s, preferably of at least 100 GBit/s.

A further solution of the object underlying the invention consists in a connection device, in particular a terminal/clamp, for a pre-described cable, comprising a receiving area, at least one internal line and one contact bridge with at least one electrically conductive section, wherein the contact bridge is designed to electrically connect at least one electrical line of a section of the cable that can be arranged and/or is arranged in the receiving area in an activated state, and to disconnect the electrical connection in a deactivated state, wherein it is further provided that the receiving area is designed to receive any section of the cable, or wherein the receiving area has a contact element for contacting the optical conductor of the cable and is exclusively designed to receive one end of the cable.

The internal line is electrically conductive and can, in particular, be designed as a bulbar.

Several connection devices can be arranged, for example, in a distribution device described in the following, wherein the internal lines of at least two connection devices are connected. This creates a distribution device, which is designed to distribute electrical power or data to be transmitted.

The connection device has, in particular, a receiving area for a cable according to the invention.

The receiving area preferably has a shape that corresponds to the shape of the cross-section of the cable, so that the cable can only be arranged in a firmly defined orientation in the receiving area.

When the contact bridge is activated, an electrical connection is established between the electrically conductive sections of the contact bridge and the electrical lines of the cable. During activation, the electrically conductive sections can therefore electrically contact with the internal lines of the connection device, so that the electrical lines of the cable via the electrically conductive sections of the contact bridge are in an electrical contact with the internal lines of the connection device.

In a first embodiment of the connection device according to the invention, the receiving area is configured to receive any section of the cable.

In particular, this means that the connection device can be arranged at any point along the length of the cable, so that the cable passes through the receiving area, i.e. that the cable is led into the receiving area on one side and led out of the receiving area on an opposite side.

The connection device and the contact bridge may then be designed in such a way that the section of the cable is enclosed by the connection device in the manner of a terminal/clamp. The receiving area and a bottom of the contact bridge can be shaped in such a way that, in the activated state of the contact bridge, a passage corresponding to the shape of the cross-section of the cable is formed between the underside of the contact bridge and the receiving area, in which the cable can only be arranged in a defined orientation.

In another embodiment, the receiving area is exclusively configured to receive one end of the cable and further has a contact element for contacting the optical conductor of the cable.

In other words, one end of the cable according to the invention can be inserted into such a designed receiving area in a way that the contact element of the connection device can be contacted with the optical conductor, so that optical signals can be transmitted to the connection device via the optical conductor and the contact element. The connection device preferably has an optical conductor, for example a glass fiber, which is in turn connected to the contact element.

Preferably, in the second embodiment, the connecting device, in particular the receiving area, has an insertion opening which has a shape corresponding to the cross-section of the cable. The end of the cable can then only be inserted into the receiving area in a fixed defined orientation.

With advantage, the contact bridge has several electrically conductive sections, whereof the number of electrically conductive sections of the contact bridge corresponds equally to the number of electrical lines of the cable or twice the number of electrical lines of the cable.

It is preferably provided that the contact bridge is arranged pivotably and/or movable on the connection device and/or is insertable into the connection device, wherein the contact bridge is designed to be pivoted, displaced or inserted into the connection device for activation in such a way that the at least one electrically conductive section penetrates the sheathing of a section of the cable arranged in the receiving area and/or penetrates the sheathing and contacts at least one electrical line of the cable.

In other words, when the contact bridge is activated, the electrically conductive sections are pressed into the cable in such a way that they penetrate the sheathing and establish electrical contact with the electrical lines of the cable. An electrically conductive contact to the internal lines of the connection device can then be further provided via the electrically conductive sections, so that overall the electrical lines of the cable and the internal lines of the connection device are electrically connected to each other via the electrically conductive sections.

It is particularly preferred that the connection device, in particular the contact bridge, is designed in such a way that the optical conductor is not damaged when the contact bridge is activated.

In particular, in the first embodiment of the connection device, this means that the connection device enclosing the cable in the activated state of the contact bridge only establishes electrical contact with the electrical lines within the cable, without damaging the optical conductor. In this way, the connection device creates a switch for the electrical energy conducted by the electrical lines without affecting the integrity of the optical conductor embedded in the cable.

In the second embodiment of the connection device, in which the receiving area is designed to receive only one end of the cable, it is preferably provided that the optical conductor is not damaged when the contact bridge is activated.

Advantageously, it can be provided that the contact element of the second embodiment protrudes into the receiving area and/or has an interior space into which the optical conductor can be inserted for contacting.

The cavity with the optical conductor arranged therein is accessible at one end of the cable that can be guided into the receiving area. When arranging the end of the cable in the receiving area, whereby the cable is preferably pushed into the receiving area for this purpose, the optical conductor accessible from the front side of the cable can then be pushed into the interior of the contact element.

In this way, an optical connection can be created between the optical conductor of the cable and the contact element of the connection device.

Preferably, the contact element is in the form of a pipe.

Preferably, the contact element has an outer diameter which is smaller than the diameter of the cavity of the cable.

When the end of the cable is inserted into the receiving area, the contact element, which is preferably in the form of a pipe, is pushed into the cavity of the cable and, at the same time, the end of the optical conductor arranged in the cavity penetrates into the interior of the contact element, which is preferably in the form of a pipe.

Particularly preferably, the interior of the contact element, especially the contact element in the form of a pipe, is filled with a, particularly non drying, optical gel.

Thus, when arranging or inserting the end of the cable into the receiving area of the connection device, if the optical conductor is inserted into the interior of the contact element of the connection device, an optical connection is established between the optical conductor of the cable and the contact element via the preferably non-drying, optical gel arranged therein. Optical signals coupled into the contact element in this way can be transmitted via optical guide agents of the connection device and, in particular, directed to a second connection device.

Particularly preferably, the contact element has a funnel-shaped insertion area.

If the contact element is designed as a pipe, it can be provided that the inner diameter of the pipe decreases in the direction away from the receiving area, whereby the outer diameter of the pipe preferably remains constant. In other words, the wall thickness of the contact element designed as a pipe increases in the direction pointing away from the receiving area.

If the end of the cable is inserted into the receiving area, the contact element, which projects into the receiving area and is preferably in the form of a pipe, penetrates into the cavity of the cable. At the same time, the optical conductor located in the cavity is guided along the funnel-shaped insertion area into the interior of the contact element and centered in the interior of the contact element.

In particular, if an optical gel is provided in the interior of the contact element, the optical gel establishes an optical connection between the end of the optical conductor of the cable and the contact element and the optical conducting agents preferably connected thereto.

The contact element and the optical guiding agent can be formed integrally as one single pipe.

With particular advantage, a locking device can be provided, designed to prevent the activation of the contact bridge as long as one end of the cable is not completely arranged in the receiving area.

In other words, a mechanical lock is preferably used to prevent pivoting, displacement or insertion of the contact bridge on or into the connection device as long as the lock is not released by fully arranging the end of the cable into the receiving space.

This ensures that the connection between the electrical lines of the cable and the internal lines of the connection device or between the optical conductor of the cable and the contact element or the optical guide agent of the connection device is always optimal.

Preferably, the locking device has at least one, more preferably at least two, most preferably spring-loaded, safety bars With further advantage, it can be provided that the contact bridge can be set into a deactivated state and that the electrical connection is completely disconnected in the deactivated state.

A further solution of the object underlying the invention consists of a distribution device comprising at least two, preferably at least three, very particularly, preferably at least four, pre-described connection devices, wherein the internal lines of at least two of the connection devices are electrically connected to one another, and/or wherein the contact elements of at least two of the connection devices are connected to each other.

With further advantage, it can be provided that the distribution device is part of a (flush-mounted box) or that the distribution device is a flush-mounted box.

The distribution device can have optical switches, so that optical signals from the optical conductor of an inserted cable can be branched off and routed to a number of contact elements of multiple connection devices Preferably, the distribution device may comprise a circuit board connectable to the internal lines of the connection devices. According to a further embodiment, the at least one circuit board has an IP address. In this way, each circuit board can obtain its own IP address, and via the IP address, each distribution device or each further component is recorded in the system and in the position within a line.

Another solution to the object underlying the invention is to provide a system for conducting and distributing electrical power and for providing a fast data-conducting communication link, with at least one pre-described distribution device and at least one pre-described cable.

Thus, a power supply and a fast data-conducting communication link, for example for fast Internet connection, can be provided by means of the system according to the invention.

Provision can preferably be made for the at least one cable of the system to be arranged in an electrically, magnetically or electromagnetically shielded installation pipe.

By laying the cable in installation pipes that are completely shielded electrically, magnetically and electromagnetically, the radiation exposure in the building, for example in an apartment or office, is significantly reduced. Among other things, this can also provide an electrical or electronic installation that completely dispenses with the use of WLAN and other wireless networks in order to consistently reduce radiation exposure.

For this purpose, the system can further include a docking station into which a portable data processing device, for example a smartphone, cell phone, or tablet, can be inserted when entering a building equipped with the system. Software running on the portable data processing device then automatically ensures that the portable data processing device logs off from the cellular network. Mobile phone calls and messages then enter the premises exclusively via the Internet through a router and are routed into wired phones or computers via the system according to the invention. Voice calls can be made using a hands-free kit.

Any data present on the portable data processing device inserted into the docking station, such as movies, media, etc., can be accessed via wired devices such as tablets or PCs within the system. Upon leaving the building, the portable data processing device is removed from the docking station, whereupon the same in turn logs off from the system using the software running on the portable data processing device and establishes a radio connection to mobile radio antennas again.

With even further advantage, the aforementioned cable, the aforementioned connection device, the aforementioned distribution device, and the aforementioned system can be combined with the system described in the applicant's German Patent Application No. 10 2018 117906.5

Yet another solution to the object underlying the invention is to provide a device for cutting an above-described cable to length, comprising a cutting part with at least a first cutting edge and a second cutting edge, and a cable receptacle for receiving the cable, the device being adapted to perform the following steps:

a) Creating a cut at least in a first area of the sheathing of a cable inserted into the cable receptacle by cutting into the sheathing using the first cutting edge, b) scratching the optical conductor with the second cutting edge, and c) spreading the cable along the cut in the sheathing and breaking the optical conductor Preferably, it is provided that by means of the first cutting edge, the sheathing and/or the cable is not completely cut through, but that first a cut is made in the first area of the sheathing and/or the cable. Thereby, a second area of the sheathing of the cable may initially remain without having an incision.

After creating the cut in the first area of the sheathing, the optical conductor is scratched by means of the second cutting edge. By spreading the cable along the cut in the sheathing, the optical conductor is bent and broken at the scratched point. This procedure ensures that the cut or break point of the optical conductor is relatively smooth or flat, so that optical signals emerging from the optical conductor can be transmitted without or only with minor losses. The step of spreading the cable can already begin while the cut is being made in the first area of the sheathing. In any case, the step of spreading the cable continues until the optical conductor breaks after the step of scratching the optical conductor.

In a cross-sectional view of the cable, the at least one electrical line, preferably several electrical lines, may be arranged in a first region of the cross-section, while the optical conductor, or the cavity with the optical conductor arranged therein, is disposed in a second region of the cross-section. The first cut is made by means of the first cutting edge in the first area, so that the first cutting edge first cuts through the sheathing and, if applicable, the electrical lines present there, but leaves the optical conductor undamaged. The first cutting edge can be positioned and arranged in such a way that the first cut reaches directly to the optical conductor, or that the first cutting edge opens the cavity with the optical conductor when creating the cut in the first area.

The optical conductor is then scratched with the second cutting edge and broken by spreading the cable along the cut in the sheathing.

Preferably, it can be provided that the first cutting edge is designed for severing at least one electrical line.

Furthermore, it can be provided that the second cutting edge is a reamer, in particular a diamond reamer, or a cutting wheel.

The second cutting edge is further preferably designed as a glass cutter.

Furthermore it can be provided that the cable receptacle has a first part and a second part, and that the device has a spreading mechanism configured to pivot the first part and the second part of the cable receptacle relative to each other, so that the cable arranged in the cable receptacle is spread open along the cut.

With further advantage, it can be provided that the cable receptacle, in particular the first part and the second part, is designed complementary to the cross-section of the cable, so that the cable can only be inserted into the cable receptacle in a fixed orientation.

The fact that the cable can only be inserted into the cable receptacle in a fixed orientation ensures that the cut made by the first cutting edge only occurs in the first area of the sheathing, and in particular that the first cutting edge does not come into contact with the optical conductor.

If the cross-section of the cable is arrowed or arrow-shaped, it is preferred that the cross-section of the cable receptacle is also arrowed or arrow-shaped.

With further advantage, it can be provided that the cutting part has a third cutting edge, which is designed, preferably after breaking the optical conductor, to completely cut through or sever the sheathing and/or the cable.

Thus, it can be provided that the first cutting edge cuts or severs the first region of the sheath and/or the cable, possibly with the electrical lines, until the optical conductor is accessible to the second cutting edge. A second area of the sheathing can still remain intact, so that the cable is not completely cut or severed. After the optical conductor has been scratched and broken, the third cutting edge is used to cut through the second region of the sheathing that has not been cut or severed up to that point, so that the cable is completely severed.

Furthermore, it may preferably be provided that the device is a pair of pliers.

In other words, the device preferably comprises two handle levers that can be pivoted towards each other, similar to a pair of pliers. In the area of the pliers head, the cutting part, the cable receptacle and, if necessary, the spreading mechanism are arranged.

With further advantage, it can be provided that the cutting part has a first edge with the first cutting edge and a second edge with the second cutting edge, and preferably with the third cutting edge, wherein the first edge and the second edge are aligned with one another at an angle of between 90° and 120°, particularly preferably between 95° and 100°.

Due to the substantially obtuse angle between the first edge and the second edge, the second cutting edge arranged at the second edge is guided along the optical conductor at an acute angle when the optical conductor is scratched, so that the optical conductor is scratched without transmitting large mechanical forces that could cause premature breakage of the optical conductor.

Furthermore, it can be provided that the first cutting edge has at least one notch with cutting edges for separating at least one electrical line.

A further solution of the object underlying the invention consists in a method for cutting a cable as described above, which can be carried out with a device as described above. The method comprises the following steps:

a) producing a cut at least in a first region of the sheathing of cable inserted into the cable receptacle by cutting into the sheathing, b) scratching the optical conductor, and c) spreading the cable along the cut of the sheathing and breaking of the optical conductor.

Further preferably, the method may comprise the step of:

d) after breaking of the optical conductor, complete cutting of the sheathing and/or the cable.

BRIEF DESCRIPTION OF THE DRAWINGS

Various embodiments of the invention are explained in more detail below with reference to the drawings. They show.

PREFERRED EMBODIMENTS OF THE INVENTION

Figure 1:
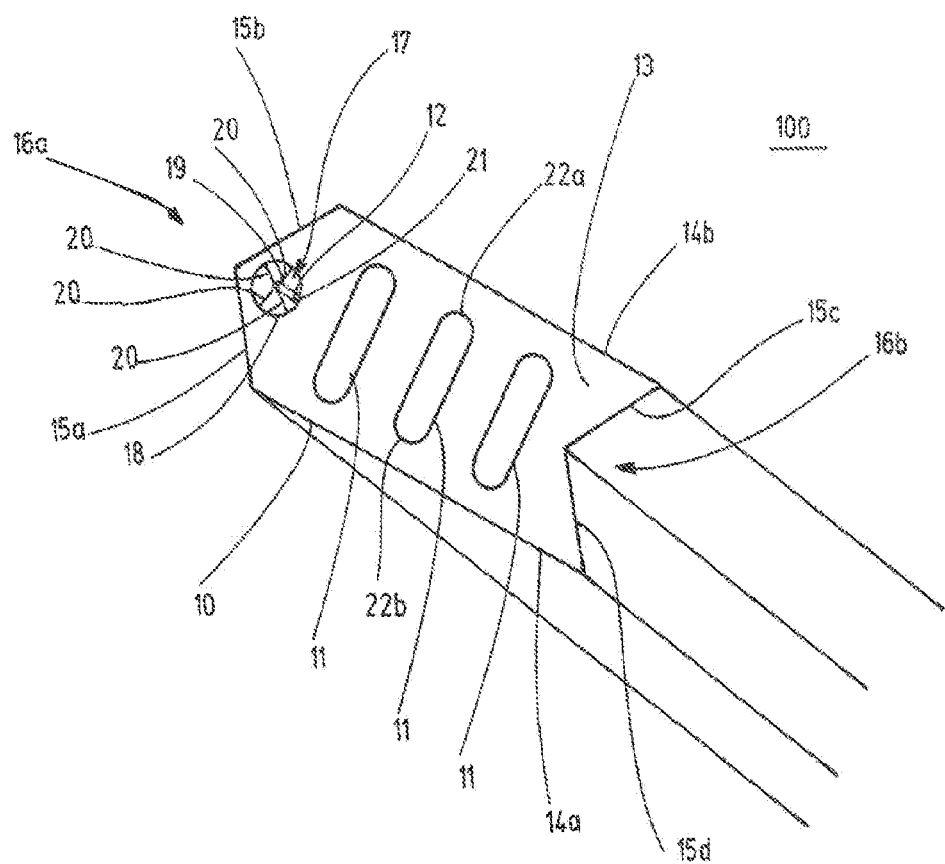
FIG. 1 a perspective view of a cable with electrical lines and an optical conductor, FIG. 2 a perspective representation of a distribution device, FIG. 3 a cross-sectional view of a distribution device with connection devices arranged in the interior, FIG. 4 a perspective side view of a distribution device with a receiving area FIG. 5 a perspective view of a receiving area with a contact element, FIG. 6 a perspective view of a further distribution device in an open state FIG. 7 a perspective view of the further distribution device with a cable inserted into the distribution device, FIG. 8 a perspective view of a closed distribution device with a cable FIG. 9 a schematic diagram of a system for conducting and distributing electrical power and providing a fast data-conducting communication link, FIG. 10 a device for cutting a cable with electrical lines and an optical conductor, FIG. 11 a device for cutting a cable to length with the cable arranged in a cable receptable, FIG. 12 a cross-sectional view of a cable, FIG. 13 a device for cutting a cable to length according to a first process step for cutting a cable, FIG. 14 a device for cutting a cable to length according to a second step for cutting a cable, an FIG. 15 a device for cutting a cable to length after a third process step for for cutting a cable.
Figure 9:
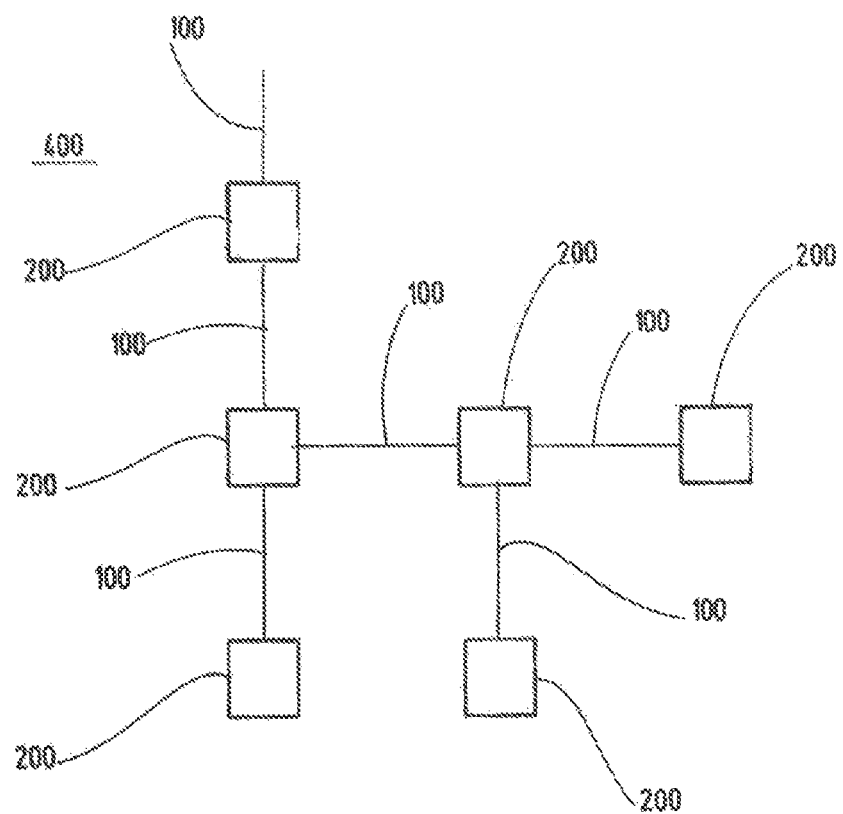

FIG. 1 shows a cable 100 for a system 400 for conducting and distributing electrical power and for providing a fast, data-conducting communication link (FIG. 9). The cable 100 comprises a sheathing 10 and electrical lines embedded in the sheathing 11. In addition, in the sheathing 10, an optical conductor 12 is embedded. The cable 100 has a cross-section 13 with a one-fold rotational symmetry. In the case shown, the cross-section 13 is a hexagonal cross-section 13. The hexagonal cross-section 13 has an arrowed or arrow-shaped form. The arrowed or arrow-shaped cross section 13 is formed by two parallel long sides 14a, 14b. At the ends, two short sides 15a, 15b, 15c, 15d each run between the long sides 14a, 14b, which have an outwardly directed tip 16a on one side of the cross-section 13 and an inwardly directed tip 16b on the opposite side.

In the region of the outwardly directed tip 16a of the cross-section 13, a cavity 17 is arranged which extends along the entire length of the cable 100. Alternatively, and in some applications preferred, the cavity 17 can be arranged centrally in the cross-section 13 of the cable 100. The cavity 17 is tubular, pipe-like or channel-like in shape and has a circular cross-section. The optical conductor 12 is centrally located in the cavity 17 and is fully spaced apart from a wall 18 of the cavity 17 arranged. In order to position the optical conductor 12, positioning means 19 are provided in the form of four thin membranes 20 which project radially inwards from the wall 18 of the cavity. The optical conductor 12 is positioned at the point of contact of the membranes 20. The optical conductor 12 is formed as a glass fiber 21 and can be a multimode conductor or a single-mode conductor. The electrical lines embedded in the sheathing 10, are made of copper and run in the cable 100 essentially parallel to each other.

The electrical lines 11 have an elongated cross-section with a substantially rectangular basic shape, wherein the upper sides 22a and bottom sides 22b of the electrical lines 11 are rounded. The optical conductor 12 has a diameter of about 125 µm, and the diameter of the cavity 17 is about 0.7 mm. The sheathing 10 consists of a plastic material. The electrical lines 11 are designed in particular for the transmission of electrical energy. Due to the optical conductor 12, the cable 100 can furthermore be used for transmitting data at high transmission rates for a fast data-conducting communication link.

Figure 2:
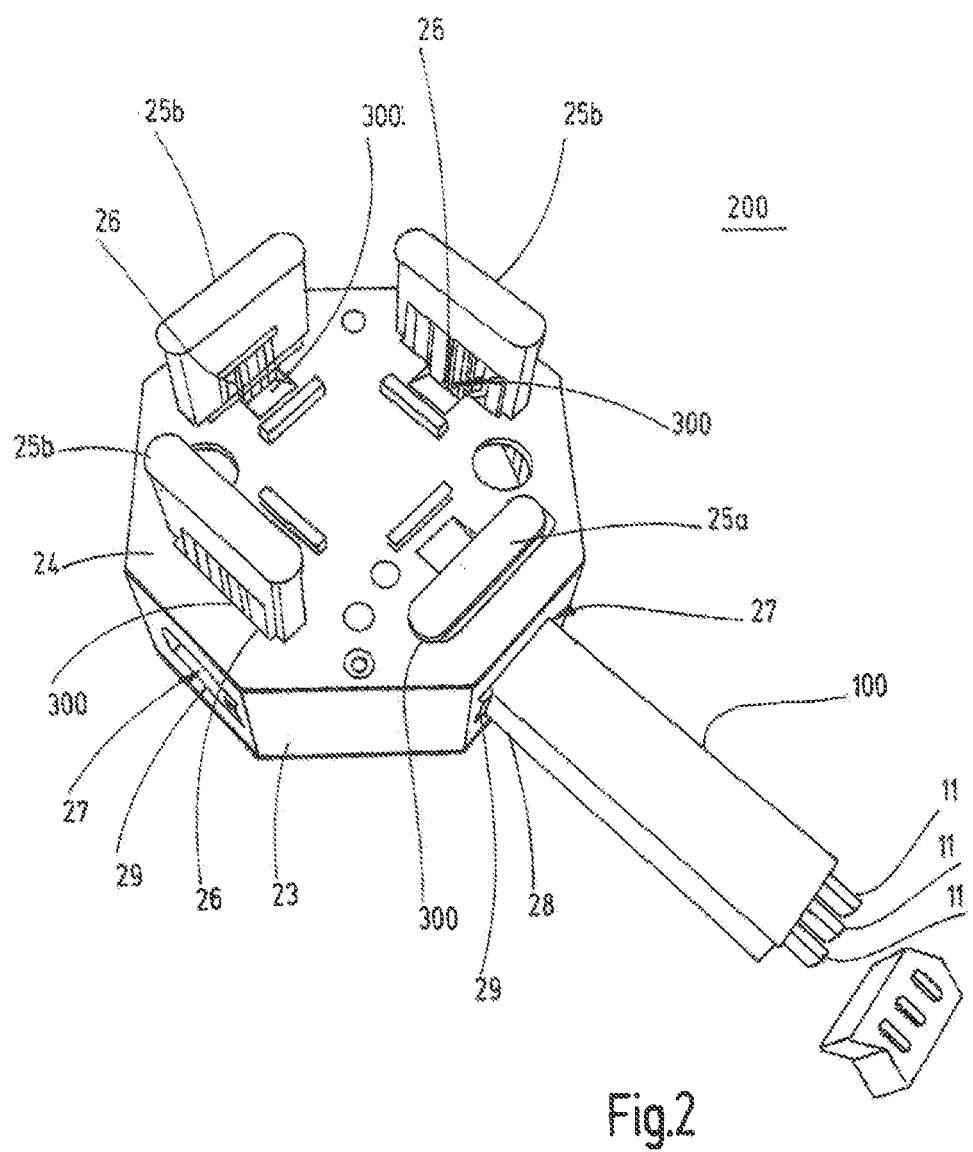

FIG. 2 shows a distribution device 200 with a basic housing 23 and a lid-like upper part of the housing 24. Four connection devices 300 (FIG. 3) are arranged inside the distribution device 200, as described below and not completely visible in FIG. 2.

The connection devices 300 each comprise a contact bridge 25a, 25b, which can be guided from the outside through openings 26 provided for this purpose in the upper part of the housing 24 and inserted into the associated connection device 300 arranged inside the distribution device 200. Each of the connection devices 300 comprises a receiving area 27, into each of which one end 28 of a previously described cable 100 can be inserted through an insertion opening 29.

The insertion openings 29 each have a cross-section which corresponds to the cross-section 13 of the cable 100. FIG. 2 shows how an end 28 of a cable 100 is inserted into one of the receiving areas 27.

The contact bridge 25a of the connection device 300, into which the end 28 of the cable 100 is inserted, is shown in FIG. 2 in an activated state, in which the contact bridge 25a is fully inserted into the associated connection device 300 through the opening 26 in the upper part of the housing 24. The remaining three contact bridges 25b are shown in a deactivated state. The cable 100 is partially stripped to reveal the electrical line 11.

Figure 3:
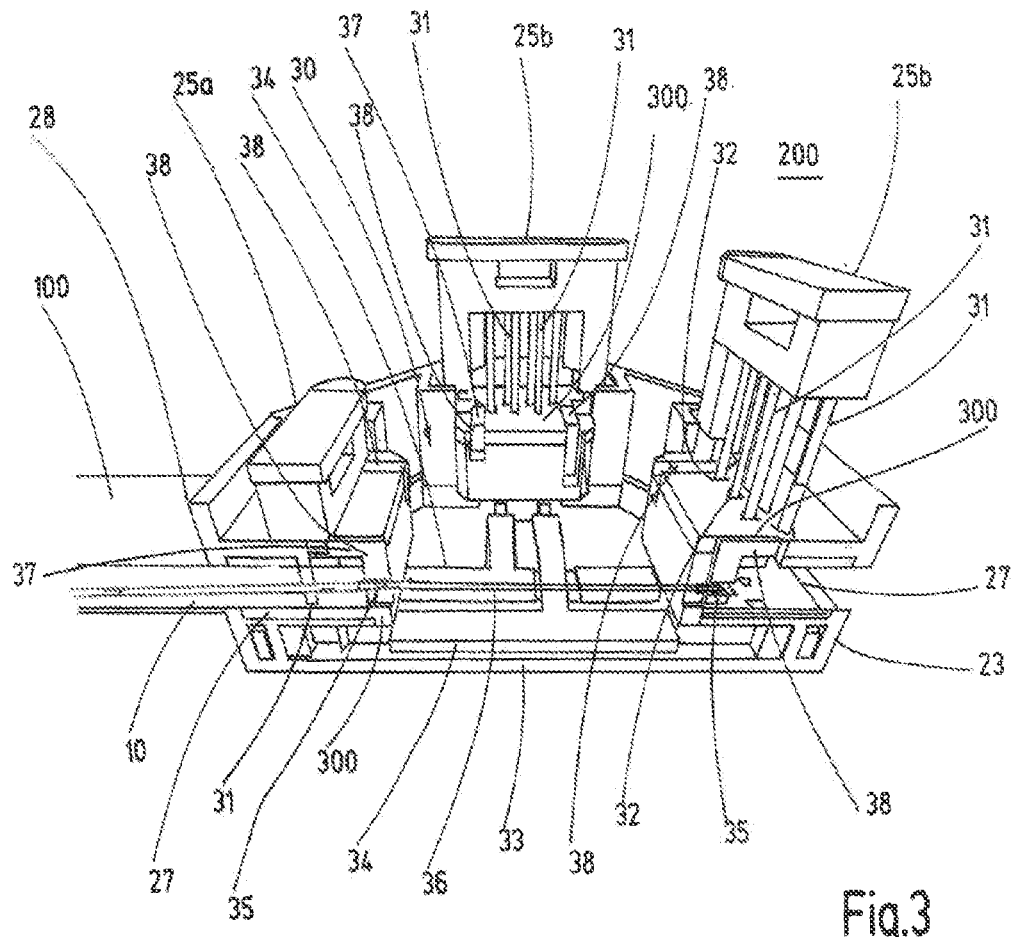

FIG. 3 shows the distribution device 200 of FIG. 2 in a cross-sectional view without the upper part of the housing 24. The connection devices 300 are arranged in an interior 30 of the distribution device 200 wherein connection devices 300 are arranged. Each of the connection devices 300 has a receiving 27 for an end 28 of a cable 100, wherein each receiving area 27 can exclusively receive the end 28 of the cable 100. Each contact bridge 25a, 25b has electrically conductive sections 31 which can be inserted into correspondingly configured openings 32, in the respective corresponding connection device 300, from above. The electrically conductive sections 31 are designed in such a way that when the contact bridge 25a, 25b is inserted into the sheathing 10 of the end 28 of the cable 100 arranged in the receiving area 27, they penetrate the sheathing 10 and contact at least one electrical line 11 of the cable. On the bottom 33 of the distribution device 200, internal lines 34 of the connection devices 300 are arranged, which electrically connect the connection devices 300 to each other.

In the activated state, inserted into the respective connection device 300, the electrically conductive sections 31 of the contact bridges 25a, 25b also contact the internal lines 34, so that an electrical contact is established between the electrical lines 11 of the cables 100 and the internal lines 34. Electrical energy can thus be transmitted from a cable 100, inserted into the end of a first connection device 300, to the further connection devices 300 and further cables 100 inserted therein. The electrical sections 31 of the contact bridges 25a, 25b are designed in such a way that when the respective contact bridge 25a, 25b is activated, the optical conductor 12 arranged in the cable 100 is not damaged. In two of the shown connection devices 300, a contact element 35 is arranged in the receiving area 27 for contacting the optical conductor 12 of an inserted cable 100. The contact elements 35 of the connection devices 300 are connected to each other via an optical conducting agent 36, so that optical signals from the optical conductor 12 of a first cable can be conducted via the contact elements 35 and the optical conducting agent 36 into a second (not shown) cable 100. The two contact elements 35 and the optical conducting agent 36 can also be formed, for example, as a pipe.

Each of the connection devices further comprises a locking device 37, wherein each locking device 37 includes two spring-loaded safety bars 38. The safety bars 38 prevent the insertion and consequently activation of the contact bridges 25a, 25b as long as no cable 100 is completely inserted into the receiving area 27. When inserting a cable 100, the safety bars 38 are displaced against the spring force by contact with the end 28 of the cable 100. Once the cable 100 is fully inserted into the receiving area 27, the contact bridge 25a, 25b can be inserted and activated. Due to the use of two safety bars 38 per locking device 37, the activation of the contact bridge 25a, 25b can be prevented even if the cable 100 is cut at an angle.

Figure 4:
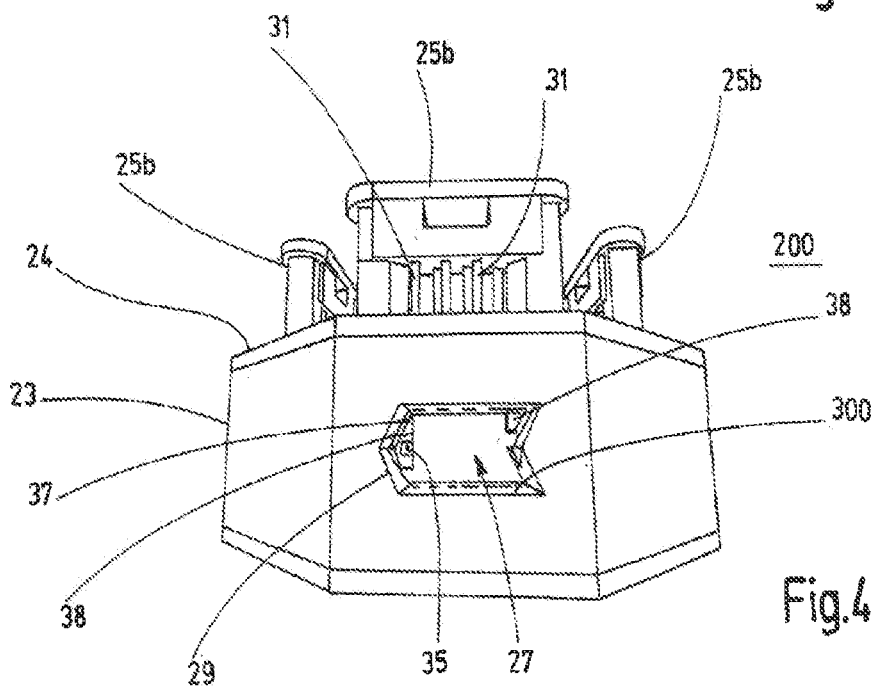

FIG. 4 shows a side view of the distribution device 200. The insertion opening 29 of the receiving area 27 is shown. The insertion opening 29 has a shape corresponding to the cross-section 13 of the cable 100. In the receiving area 27, the safety bars 38 of the locking device 37 are recognizable. In addition, the contact element 35 for contacting the optical conductor 12 of the cable 100 is visible.

Figure 5:
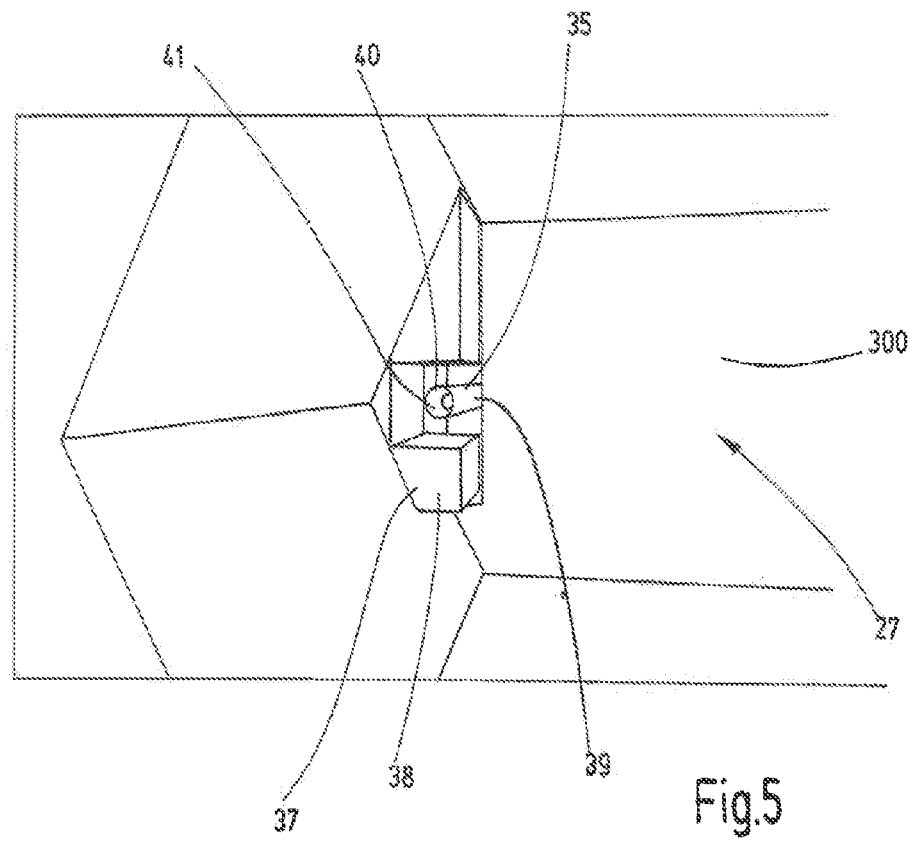

FIG. 5 shows the contact element 35 in an enlargement of the receiving area 27. The contact element 35 is essentially formed as a pipe 39 and protrudes about 2 mm into the receiving area 27. The contact element 35 comprises a funnel-shaped insertion area 40. When the end 28 of the cable 100 is inserted into the receiving area 27, the contact element 35 penetrates at least partially into the cavity 17 of the cable 100 (FIG. 1, FIG. 3). At the same time, the optical conductor 12 arranged in the cavity 17 is guided along the funnel-shaped insertion area 40 of the contact element 35 and centered in the contact element 35. A non-drying optical gel 41 is provided inside the contact element 35, so that a transition of the optical signals from the optical conductor 12 of the cable 100 into the contact element 35 can take place without significant attenuation. With the optical conductive agent 36 of the distribution device 200 adjoining the contact element 35, the optical signals can be routed to another of the distribution devices 300 and can there coupled via an identically formed contact element 35 into the optical conductor 12 of another cable 100. Instead of the contact element 35 formed as a pipe 39, the optical conductor 12 of each cable 100 can be provided with a funnel-shaped connection element into which the contact element can be inserted.

Figure 6:
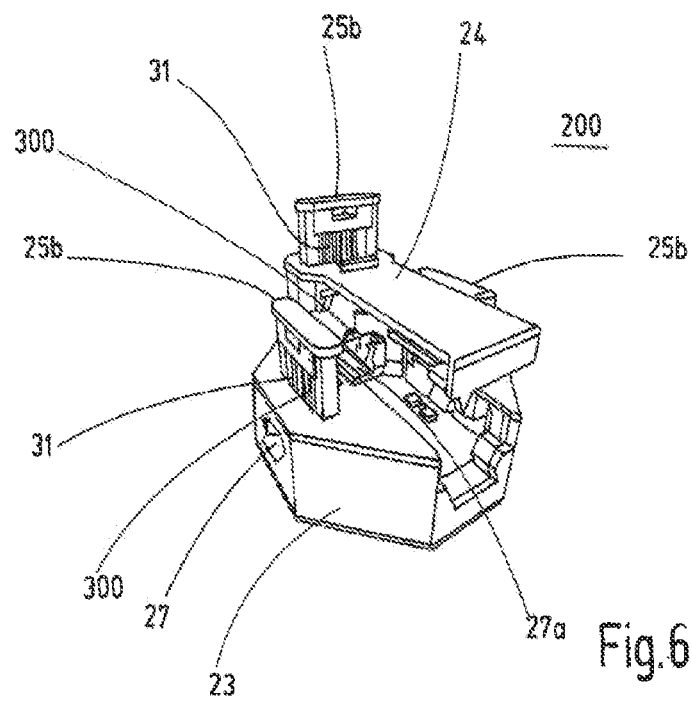
Figure 7:
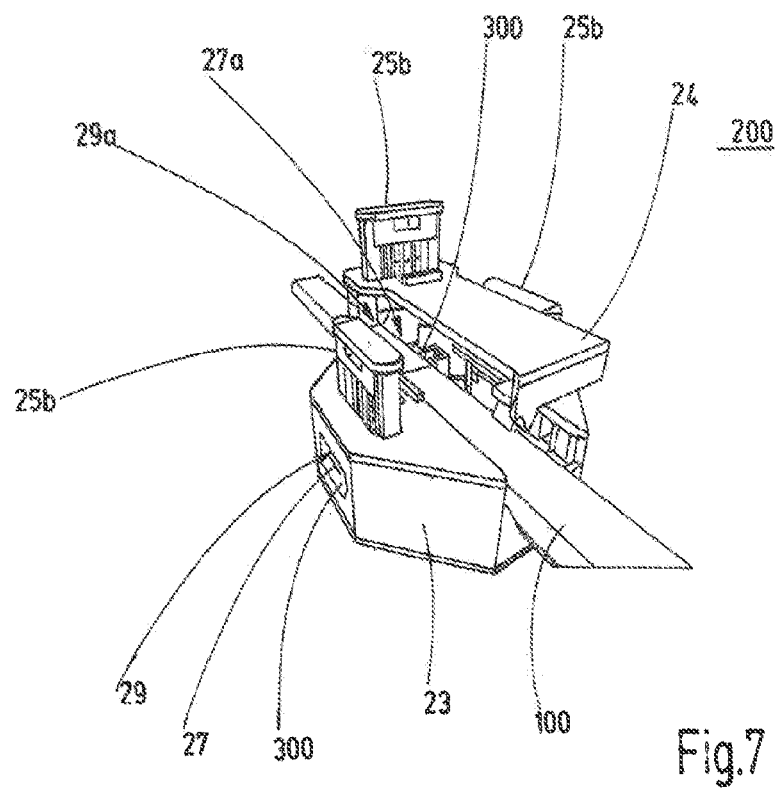

FIG. 6, shows a second embodiment of a distribution device 200. The distribution has 200 comprises a basic housing 23 and an upper part of the housing 24. Furthermore, the distribution device 200 comprises three connection devices 300 with associated contact bridges 25a, 25b. The receiving areas 27 of two of the connection devices 300 are substantially identical to the receiving areas 27 of the connection devices 300 of the first embodiment of the distribution device 200 according to FIGS. 2 to 5. The receiving area 27a of the third connection device 300 is deviatingly configured such that any section of the cable 100 can be arranged in this receiving area 27a, as shown in FIG. 7. The cable 100 passes through the entire receiving area 27a, that means, that the cable 100 is guided into the receiving area 27a on one side and is guided out of the receiving area 27a on the opposite side. After the section of the cable 100 has been inserted, the receiving area 27a is closed by arranging the upper part of the housing 24 on the basic housing 23, so that the cable 100 is held in the receiving area 27a. In order to ensure a fixed orientation of the cable 100 in the receiving area 27a, the insertion opening 29a of the receiving area 27a, which is formed between the bottom of the receiving area 27a and the upper part of the housing 24 when the latter is arranged on the basic housing 23, has a shape which corresponds to the cross-section 13 of the cable 100.

Figure 8:
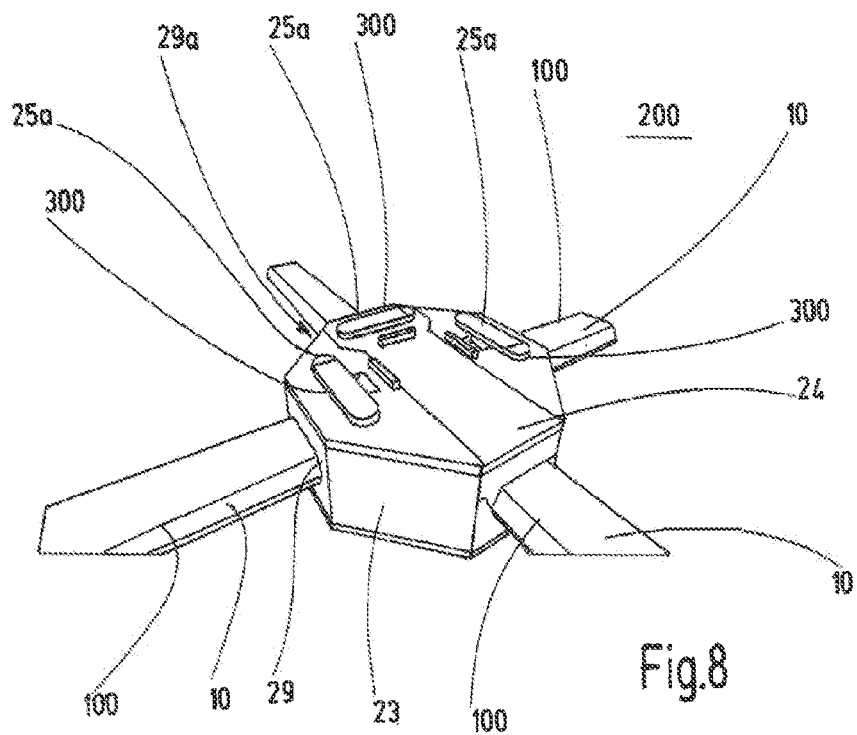

In FIG. 8, the second embodiment of the distribution device 100 is shown in a completely closed configuration. In FIG. 8, all contact bridges 25a are activated and are fully inserted into the associated connection device 300. Analogously to the first embodiment of the distribution device 100, when the contact bridges 25a, 25b are activated, electrically conductive sections 31 of the contact bridges 25a, 25b are pressed into the sheathing 10 of the cables 100 until they contact the electrical lines 11 in the cables 100 and make electrical contact with internal lines 34 of the distribution device 200. With the second distribution device 200, electrical contact can take place at any point of the cable 100. Due to the orientation of the cable 100 guaranteed by the cross-section 13 of the cable and the shape of the insertion opening 29, 29a of the receiving areas 27, 27a and a corresponding design of the contact bridges 25a, 25b, it is also ensured that the optical conductor 12 of the cable 100 is not damaged.

FIG. 9 finally shows a schematic view of a system 400 for conducting and distributing electrical power and for providing a fast data-conducting communication link, with a plurality of distribution devices 200 of the first embodiment or the second embodiment, and cables 100 connecting the distribution devices 200. The system 400 can be used for electrical installation and data communication in a building, such as a residence or an office building.

Figure 10:
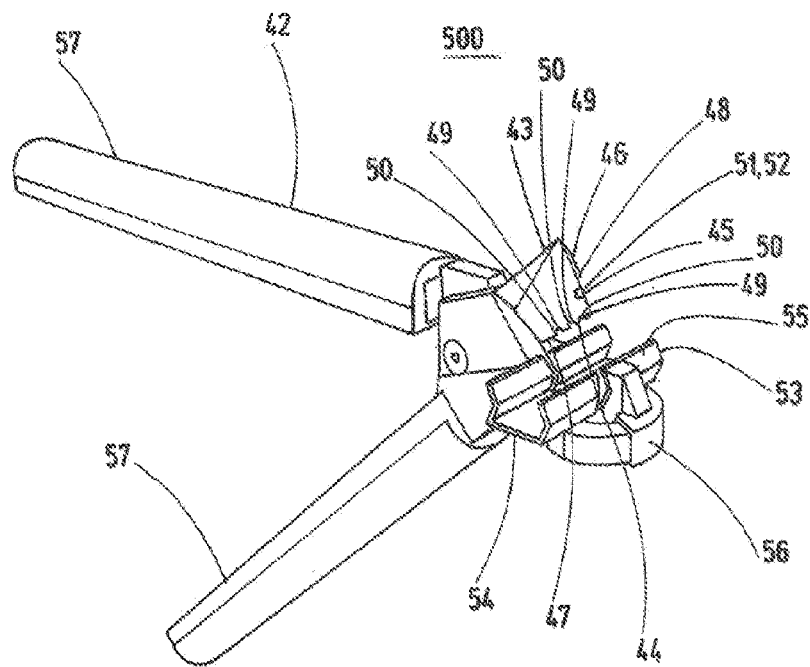

FIG. 10 shows a device 500 for cutting the cable 100 to length. The device 500 is formed as a pair of pliers 42 and comprises a cutting part 43 with a first cutting edge 44, a second cutting edge 45 and a third cutting edge 46. The first cutting edge 44 is arranged at the first edge 47 of the cutting part 43. The second cutting edge 45 and the third cutting edge 46 are arranged at a second edge 48 of the cutting part 43. The second edge 48 is thereby at an angle of about 95° to the first edge 47. The first cutting edge 44 has notches 49 with cutting edges 50 for separating the electrical lines 11 in the cable 100. The second cutting edge 45 is designed as a reamer 51, in particular as a diamond reamer 52.

Furthermore, the device 500 comprises a cable receptacle 53 with a first part 54 and a second part 55, as well as a spreading mechanism 56, which is configured to pivot the first part 54 and the second part 55 relative to each other. The cable receptacle 53, in particular the first part 54 and the second part 55, are formed complementary to the cross-section 13 of the cable 100 (FIGS. 1, 11 and 12), so that the cable 100 can only be inserted into the cable receptacle 53 in a fixed orientation. If the cable 100 is formed in an arrowed or arrow-shaped manner, then the cable receptacle 53 is also formed in an arrowed or arrow-shaped manner. The device 500 further comprises two handle levers 57, which can be manually moved towards each other.

Figure 11:
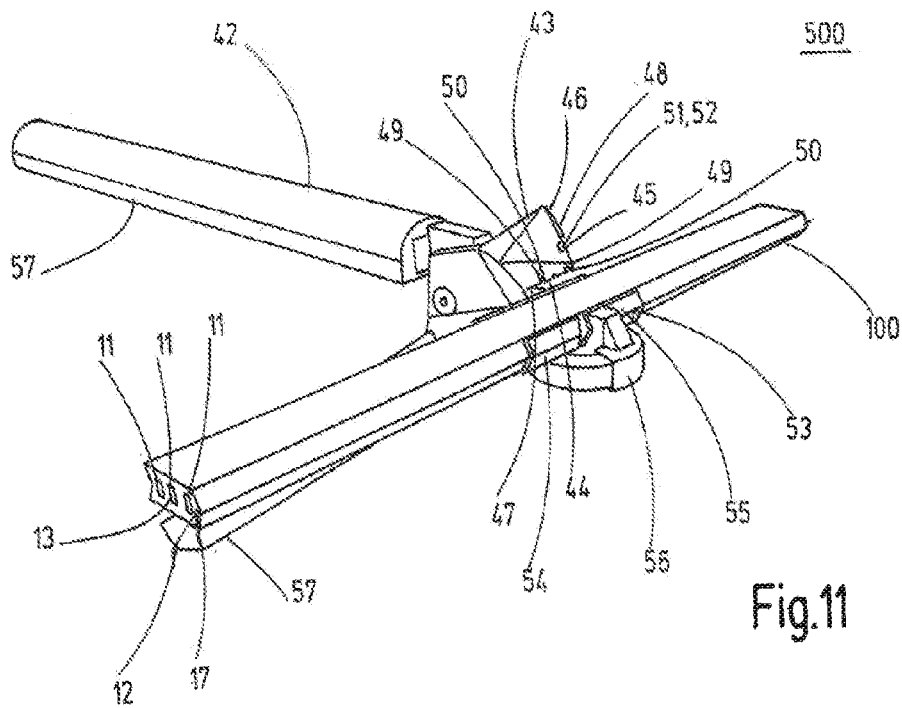

FIG. 11 shows the device 500 with a cable 100 inserted into the cable receptacle 53. The cable 100 is formed arrowed and has three electrical lines 11 and an optical conductor 12 arranged in a cavity 17. Corresponding to the number of electrical lines 11, the first cutting edge 44 of the cutting part 43 has three notches 49 with cutting edges 50.

Figure 12:
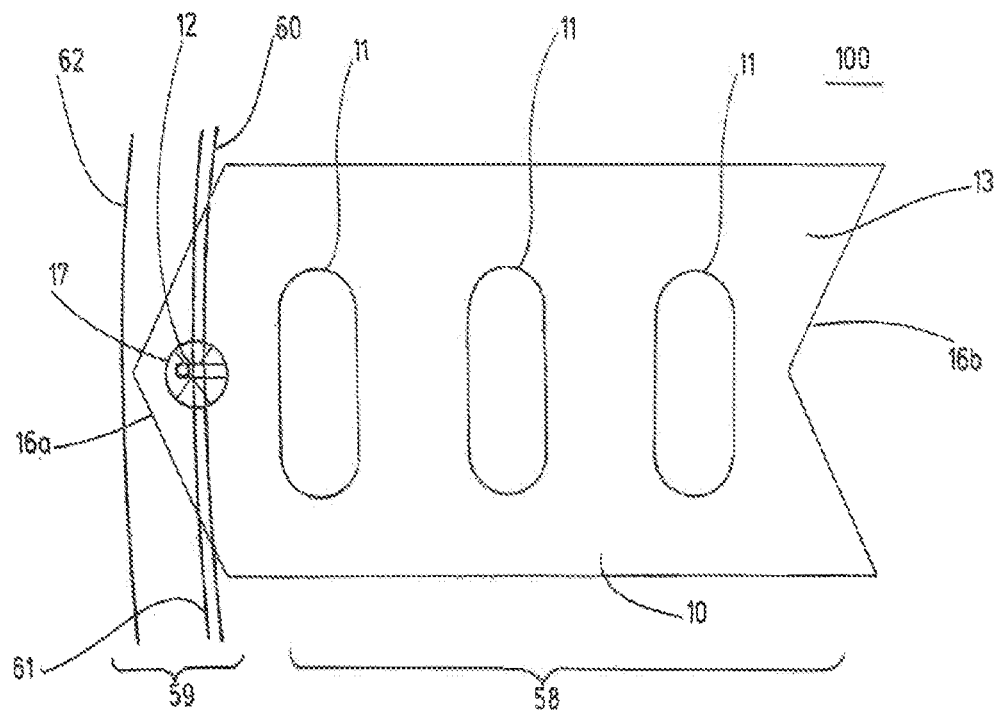

FIG. 12 shows the cable 100 in a cross-sectional view. As previously explained with respect to FIG. 1, the cross-section 13 is a hexagonal, arrowed or arrow-shaped cross-section 13, with an outwardly directed tip 16*a* and an inwardly directed tip 16*b*. Three electrical lines 11 are arranged in the sheathing 10 in a first section 58 of the sheathing 10 with the inwardly directed tip 16*b*. A second section 59 of the sheathing 10 comprises the outwardly directed tip 16*a* and the cavity 17 with the optical conductor 12 arranged therein.

Figure 13:
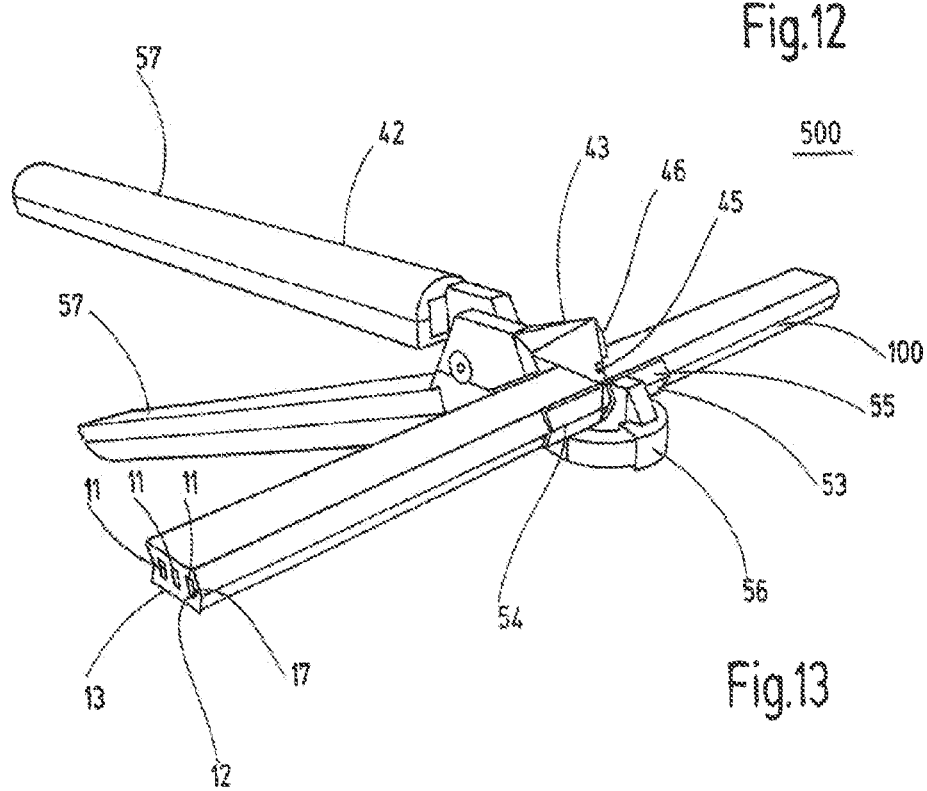

FIG. 13 shows the device 500 with the cable after the pliers 42 are closed by approximately 20°. By means of the first cutting edge 44, the cable 100 is cut in the first section 58, starting from the inwardly directed tip 16*b* up to the first cutting line 60 according to FIG. 12, so that the cavity 17 is cut or opened.

Figure 14:
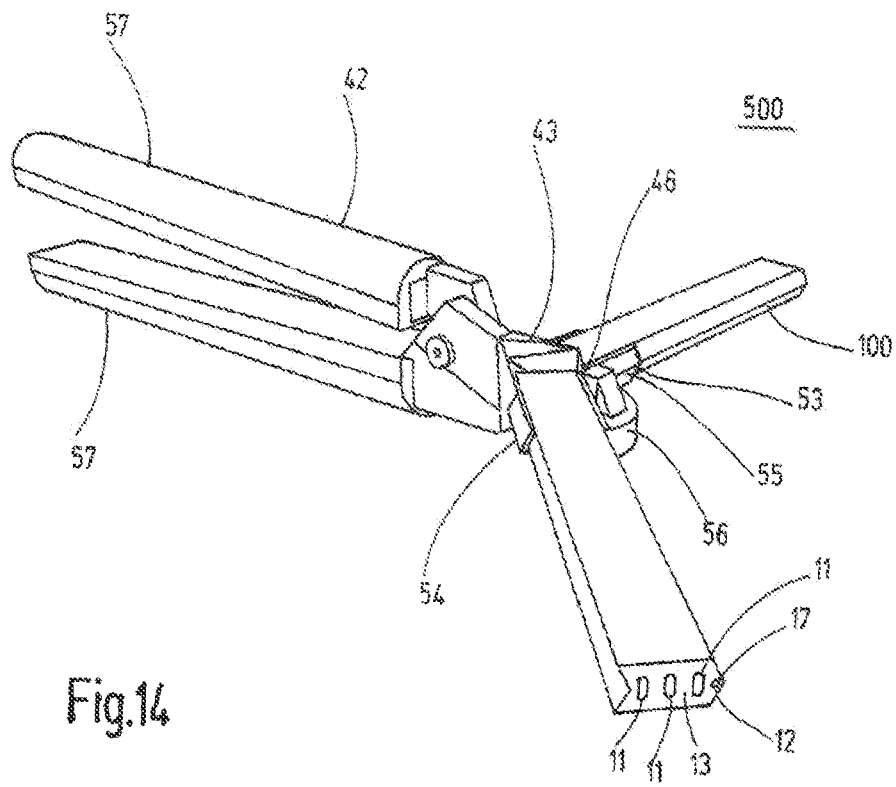

If the pliers 42 are closed further, the second cutting edge 45 slides along the optical conductor 12 to the second cutting line 62 according to FIG. 12. This scratches the optical conductor 12. At the same time, the spreading mechanism 56 ensures that the first part 54 and the second part 55 of the cable receptacle 53 are moved against each other, so that the cable 100 is spread along the cut of the first cutting edge 44, as shown in FIG. 14. Thereby, in particular in the second section 59 of the sheathing 10 with the outwardly directed tip 16*a*, a part of the sheathing 10 remains, so that the cable 100 is not yet completely cut.

Figure 15:
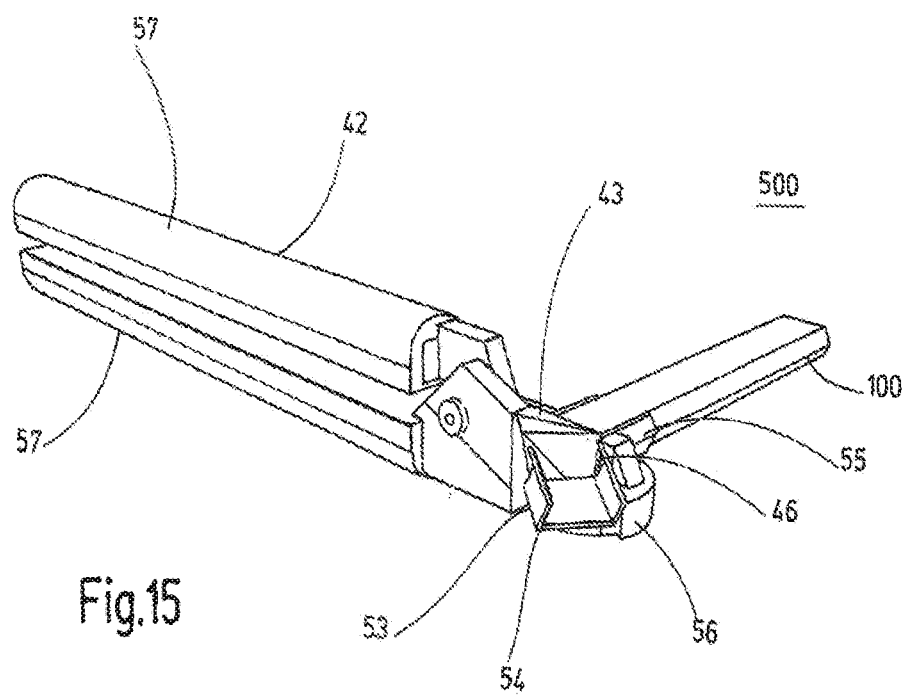

If the pliers 42 are closed further, the state according to FIG. 15 is reached, in which the third cutting edge 46 has cut the remaining part in the second section 59 of the cross-section 13 of the cable 100 until the third cutting line 62 according to FIG. 12. The completely cut cable 100 can then be taken out of the cable receptacle 53.

If, in an alternative embodiment of the cable 100, the cavity 17 is arranged centrally in the cross-section 13 of the cable 100, the lengths and orientations of the cutting edges 44, 45, 46, in particular the third cutting edge 46, shall be adapted accordingly.

The invention claimed is:

1. A cable for a system for conducting and distributing electrical energy and for providing a fast data-conducting communication link, comprising a sheathing, characterized in that at least one electrical line and an optical conductor are embedded in the sheathing, that the cable has a cross-section with a one-fold rotational symmetry, that the cross-section is arrowed or arrow-shaped and formed by two parallel long sides and short sides connecting the ends of the long sides, said short sides forming an outwardly directed tip or triangular shape on one side of the cross-section and an inwardly directed tip or triangular shape on an opposite side of the cross-section.

2. The cable according to claim 1, characterized in that the cross-section is an n-polygonal cross-section.

3. The cable according to claim 1, characterized in that the sheathing has a cavity, wherein the cavity is arranged running over an entire length of the cable.

4. The cable according to claim 3, characterized in that the optical conductor is arranged in the cavity, in that the optical conductor is completely distanced from a wall of the cavity, and/or that the optical conductor is preferably arranged centrally in the cavity.

5. The cable according to claim 3, characterized in that positioning means are arranged in the cavity for positioning the optical conductor in the cavity.

6. The cable according to claim 1, characterized in that at least three electrical lines are provided, and/or in that at least one electrical line consists of copper, and/or in that the optical conductor is a glass fiber, and/or that the optical conductor has a diameter between 100 μm and 150 μm and/or that the cavity has a diameter between 0.7 mm and 0.9 mm and/or that the optical conductor is a multimode conductor or a single conductor.

7. A connection device, in particular terminal, for a cable according to claim 1, comprising a receiving area, at least one internal line and a contact bridge with at least one electrically conductive section, wherein the contact bridge is designed to electrically connect in an activated state the at least one internal line to the at least one electrical line of a section of the cable arrangeable or arranged in the receiving area, and to disconnect in a deactivated state the electrical connection, characterized in that the contact bridge is arranged pivotable or movable on the connection device or is insertable into the connection device, wherein the contact bridge is configured to be pivoted, displaced or inserted into the connection device for activation in such a way that the at least one electrically conductive section penetrates the sheathing of a cable arranged in the receiving area and makes contact with the at least one electrical line of the cable, and that the receiving area is configured to receive any section of the cable, or wherein the receiving area has a contact element for contacting the optical conductor of the cable and is exclusively configured to receive one end of the cable.

8. The connection device according to claim 7, characterized in that the contact bridge is designed in such a way that the optical conductor is not damaged when the contact bridge is activated.

9. The connection device according to claim 7, characterized in that the contact element projects into the receiving region.

10. The connection device according to claim 7, characterized in that the contact element is in the form of a pipe.

11. The connection device according to claim 7, characterized in that the contact element has a funnel-shaped insertion area.

12. The connection device according to claim 7, characterized in that a locking device is provided, which is designed to prevent the activation of the contact bridge as long as an end of the cable is not completely arranged in the receiving area.

13. A distribution device comprising at least two connection devices according to claim 7, wherein the internal lines of at least two of the connection devices are electrically connected to each other, and/or wherein the contact elements of at least two of the connection devices are connected to each other.

14. The cable according to claim 2, characterized in that n is greater than or equal to 6.

15. The cable according to claim 3, is characterized in that the cavity is formed tubular, pipe-like or channel-like, or wherein the cavity is a tube, a pipe or a channel, wherein the cavity has a rectangular or round or elliptical cross-section.

16. The cable according to claim 5, characterized in that the positioning means comprise a thread or a foil or a membrane.

17. The connection device according to claim 7, characterized in that the contact element has an interior into which the optical conductor can be inserted for contacting.

18. The connection device according to claim 7, characterized in that the interior of the contact element is filled with a nondrying optical gel.

* * * * *